(12) United States Patent
Wang et al.

(10) Patent No.: US 12,050,190 B2
(45) Date of Patent: Jul. 30, 2024

(54) THERMAL GRADIENT BATTERY MONITORING SYSTEM AND METHODS

(71) Applicant: Google LLC, Mountain View, CA (US)

(72) Inventors: David Wang, San Jose, CA (US); Arun Raghupathy, Pleasanton, CA (US); James Robert Lim, Mountain View, CA (US); Ihab A. Ali, Palo Alto, CA (US); Chang Hong Ye, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/312,477

(22) Filed: May 4, 2023

(65) Prior Publication Data

US 2023/0304951 A1    Sep. 28, 2023

Related U.S. Application Data

(63) Continuation of application No. 17/032,679, filed on Sep. 25, 2020, now Pat. No. 11,680,918.

(51) Int. Cl.
*G01N 25/72*    (2006.01)
*G01R 31/371*    (2019.01)
(Continued)

(52) U.S. Cl.
CPC ............ *G01N 25/72* (2013.01); *G01R 31/371* (2019.01); *G01R 31/392* (2019.01); *H01M 10/615* (2015.04); *H01M 10/63* (2015.04)

(58) Field of Classification Search
CPC .......................... H01M 10/615; H01M 10/63
See application file for complete search history.

(56) References Cited

U.S. PATENT DOCUMENTS 8,168,317 B2   5/2012   Yoon et al.
8,896,271 B2   11/2014  Kim et al.
(Continued)

FOREIGN PATENT DOCUMENTS

CN   204760501   11/2015
CN   105807230   3/2019
(Continued)

OTHER PUBLICATIONS

"Final Office Action", U.S. Appl. No. 17/032,685, filed Oct. 2, 2023, 21 pages.

(Continued)

*Primary Examiner* — Mirellys Jagan
(74) *Attorney, Agent, or Firm* — Colby Nipper PLLC

(57) ABSTRACT

A battery pack includes a battery, a first temperature sensor configured to provide a first temperature value associated with a temperature of the battery, a heat source disposed proximate to the battery and configured to heat the battery, a second temperature sensor configured to provide a second temperature value associated with a temperature of the heat source, and a control board coupled to the first temperature sensor and the second temperature sensor, wherein the control board is configured to receive the first temperature value and the second temperature value. The control board is configured to compare the first temperature value and the second temperature value to determine a temperature gradient between the battery and the heat source and transmit an alert if the temperature gradient exceeds a first temperature gradient threshold.

20 Claims, 9 Drawing Sheets

(51) Int. Cl.
*G01R 31/392* (2019.01)
*H01M 10/615* (2014.01)
*H01M 10/63* (2014.01)

(56) References Cited

U.S. PATENT DOCUMENTS

| | | |
|---|---|---|
| 9,768,429 B2 | 9/2017 | Chung et al. |
| 10,044,080 B2 | 8/2018 | Kim et al. |
| 10,347,877 B2 | 7/2019 | Douke et al. |
| 11,668,756 B2 | 6/2023 | Wang et al. |
| 11,680,918 B2 | 6/2023 | Wang et al. |
| 2002/0160245 A1 | 10/2002 | Genc |
| 2006/0292436 A1 | 12/2006 | Cook et al. |
| 2011/0210703 A1 | 9/2011 | Souza et al. |
| 2013/0004811 A1* | 1/2013 | Banerjee ............ H01M 10/443 374/185 |
| 2014/0099527 A1* | 4/2014 | Seong ................. H01M 50/291 429/120 |
| 2014/0269811 A1 | 9/2014 | Maleki et al. |
| 2014/0285155 A1* | 9/2014 | Choi ....................... H02J 7/02 320/134 |
| 2015/0144614 A1* | 5/2015 | Kim .................... H01M 10/486 219/494 |
| 2016/0322676 A1 | 11/2016 | Jun et al. |
| 2016/0336562 A1 | 11/2016 | Oh et al. |
| 2017/0187081 A1* | 6/2017 | Kim .................. H01M 10/615 |
| 2019/0001828 A1* | 1/2019 | Ko .................... H01M 10/6571 |
| 2019/0319466 A1 | 10/2019 | Pk |
| 2020/0313152 A1 | 10/2020 | Stefanopoulou et al. |
| 2022/0099606 A1 | 3/2022 | Wang et al. |
| 2022/0099749 A1 | 3/2022 | Wang et al. |
| 2022/0102691 A1 | 3/2022 | Wang et al. |

FOREIGN PATENT DOCUMENTS

| | | |
|---|---|---|
| CN | 110612620 | 12/2019 |
| CN | 111624502 | 9/2020 |
| JP | 2016177941 | 10/2016 |
| KR | 101926341 | 3/2019 |
| KR | 20220081583 | 6/2022 |
| WO | 2012114162 | 8/2012 |
| WO | 2014156869 | 10/2014 |

OTHER PUBLICATIONS

"Non-Final Office Action", U.S. Appl. No. 17/032,685, filed Mar. 14, 2023, 18 pages.
"Non-Final Office Action", U.S. Appl. No. 17/032,668, filed Aug. 2, 2022, 27 pages.
"Non-Final Office Action", U.S. Appl. No. 17/032,679, filed Oct. 27, 2022, 7 pages.
"Notice of Allowance", U.S. Appl. No. 17/032,668, filed Feb. 1, 2023, 9 pages.
"Notice of Allowance", U.S. Appl. No. 17/032,679, filed Feb. 15, 2023, 9 pages.
"Restriction Requirement", U.S. Appl. No. 17/032,679, filed Aug. 26, 2022, 6 pages.
Tessier, et al., "Real-Time Estimator Li-ion Cells Internal Resistance for Electric Vehicle Application", Jun. 2016, 12 pages.
Zhang, et al., "A Fully Integrated Battery-Powered System-on-Chip in 40-nm CMOS for Closed-Loop Control of Insect-Scale Pico Aerial Vehicle", Sep. 2017, pp. 2374-2386.
"Advisory Action", U.S. Appl. No. 17/032,685, filed Feb. 12, 2024, 3 pages.
"Notice of Allowance", U.S. Appl. No. 17/032,685, filed May 6, 2024, 9 pages.

* cited by examiner

FIG. 9

| Time (mins) | Normal Battery | | | Swollen Battery | | | Normal to Swollen Battery Temp Delta (degC) |
|---|---|---|---|---|---|---|---|
| | Heater Temp (degC) | PCB Temp (degC) | Delta (degC) | Heater Temp (degC) | PCB Temp (degC) | Delta (degC) | |
| 0 | 40 | 40 | 0 | 40 | 40 | 0 | 0 |
| 1 | 41 | 40 | 1 | 41 | 40 | 1 | 0 |
| 2 | 42 | 41 | 1 | 42 | 40 | 2 | 1 |
| 3 | 43 | 41 | 2 | 43 | 40 | 3 | 1 |
| 4 | 44 | 42 | 2 | 44 | 41 | 3 | 1 |
| 5 | 45 | 42 | 3 | 45 | 41 | 4 | 1 |
| 6 | 46 | 43 | 3 | 46 | 41 | 5 | 2 |
| 7 | 47 | 43 | 4 | 47 | 41 | 6 | 2 |
| 8 | 48 | 44 | 4 | 48 | 42 | 6 | 2 |
| 9 | 49 | 44 | 5 | 49 | 42 | 7 | 2 |
| 10 | 50 | 45 | 5 | 50 | 42 | 8 | 3 |
| 11 | 51 | 45 | 6 | 51 | 42 | 9 | 3 |
| 12 | 52 | 46 | 6 | 52 | 43 | 9 | 3 |
| 13 | 53 | 46 | 7 | 53 | 43 | 10 | 3 |
| 14 | 54 | 47 | 7 | 54 | 43 | 11 | 4 |
| 15 | 55 | 47 | 8 | 55 | 43 | 12 | 4 |
| 16 | 55 | 48 | 7 | 55 | 44 | 11 | 4 |
| 17 | 55 | 48 | 7 | 55 | 44 | 11 | 4 |
| 18 | 55 | 49 | 6 | 55 | 44 | 11 | 5 |
| 19 | 55 | 49 | 6 | 55 | 44 | 11 | 5 |
| 20 | 55 | 50 | 5 | 55 | 45 | 10 | 5 |
| 21 | 55 | 50 | 5 | 55 | 45 | 10 | 5 |
| 22 | 55 | 51 | 4 | 55 | 45 | 10 | 6 |
| 23 | 55 | 51 | 4 | 55 | 45 | 10 | 6 |
| 24 | 55 | 52 | 3 | 55 | 46 | 9 | 6 |
| 25 | 55 | 52 | 3 | 55 | 46 | 9 | 6 |
| 26 | 55 | 53 | 2 | 55 | 46 | 9 | 7 |
| 27 | 55 | 53 | 2 | 55 | 46 | 9 | 7 |
| 28 | 55 | 54 | 1 | 55 | 47 | 8 | 7 |
| 29 | 55 | 54 | 1 | 55 | 47 | 8 | 7 |
| 30 | 55 | 55 | 0 | 55 | 47 | 8 | 8 |

THERMAL GRADIENT BATTERY MONITORING SYSTEM AND METHODS

CROSS-REFERENCE TO RELATED APPLICATIONS

This application is a continuation of and claims priority to U.S. patent application Ser. No. 17/032,679, filed on Sep. 25, 2020, and is related to U.S. patent application Ser. No. 17/032,668, filed on Sep. 25, 2020, and U.S. patent application Ser. No. 17/032,685, filed on Sep. 25, 2020, the disclosures of which are incorporated by reference herein in their entireties.

TECHNICAL FIELD

The present invention relates to a battery thermal gradient monitoring system and methods thereof for use in a battery pack.

BACKGROUND

Battery powered electronic devices are sometimes exposed to high temperatures causing excessive battery heating and accelerated battery swell from electrolyte decomposition and gas generation. As the battery swells, the internal pressure of the cells of the battery continues to increase until the electrolyte is consumed and the battery reaches peak thickness, or a seal of a pouch holding the battery breaks open to allow the internal gas to vent and the electrolyte to leak. In some instances, if the cell pouch seal is able to withstand high pressure, as is typical for cells designed for longevity, the battery enclosure may break open to accommodate the battery expansion.

In traditional systems, a fuel gauge is typically used for monitoring the health of the battery. The fuel gauge accumulates battery capacity during charge and discharge and compares it with a reference design capacity. Decreasing battery capacity may be caused by battery degradation and may be associated with battery swell. However, in some systems, the battery is only discharged for short pulses during use resulting in the battery being mainly held at full charge, and thus rarely fully discharged. In such systems, a fuel gauge may not be able to effectively track and monitor the battery capacity degradation, and health.

SUMMARY

Implementations of the present invention are directed to a battery pack a battery, a first temperature sensor configured to provide a first temperature value associated with a temperature of the battery, a heat source disposed proximate to the battery and configured to heat the battery, a second temperature sensor configured to provide a second temperature value associated with a temperature of the heat source, and a control board coupled to the first temperature sensor and the second temperature sensor, wherein the control board is configured to receive the first temperature value and the second temperature value, wherein the control board is configured to compare the first temperature value and the second temperature value to determine a temperature gradient between the battery and the heat source and transmit an alert if the temperature gradient exceeds a first temperature gradient threshold.

In some implementations, the heat source includes a first surface and a second surface. The first surface and the second surface may be substantially parallel. The first surface may be configured to cover a majority of a top surface of the battery and the second surface may be configured to cover a majority of a bottom surface of the battery.

In some implementations, the heat source is disposed at least partially around the battery. The battery may be disposed within a battery pack and the heat source may be wrapped around an exterior surface of the battery pack to provide heat to the battery.

In some implementations, the first temperature sensor and the second temperature sensor include thermistors.

In some implementations, the control board is configured to disable an electronic device powered by the battery when the temperature gradient exceeds a second temperature gradient threshold, the second temperature gradient threshold being higher than the first temperature gradient threshold.

In some implementations, the battery is disposed within a battery pack and the battery pack includes an interior space disposed within the battery pack, the interior space being between the battery and the heat source, wherein upon degradation of the battery, the interior space increases in size.

Another implementation of the present invention is directed to an electronic device including a battery pack configured to be placed into an enclosure of the electronic device, the battery pack including a battery disposed within the battery pack and a first thermistor disposed adjacent to the battery, the thermistor providing a first temperature value associated with a temperature of the battery, a heat source disposed at least partially around battery pack and configured to provide heat to the battery, the heat source having a second thermistor disposed on the heat source and adjacent to the battery pack, the second thermistor providing a second temperature value associated with a temperature of the heat source, and a c processor configured to draw power from the battery pack, the processor coupled to the first thermistor and the second thermistor, wherein the processor is configured to compare the first temperature value and the second temperature value to determine a temperature gradient and transmit an alert to an electronic device associated with a user if the temperature gradient exceeds a temperature gradient threshold.

Another implementation of the present invention is directed to a method for monitoring battery degradation, the method including receiving a first temperature value from a first temperature sensor associated with a battery pack and a second temperature value from a second temperature sensor associated with a heat source, determining a first temperature gradient based on a comparison of the first temperature value and the second temperature value, increasing a temperature of the heat source by a predetermined amount, receiving, based on the increase of the temperature of the heat source, an increased first temperature reading and an increased second temperature reading; determining a second temperature gradient based on a comparison of the increased first temperature and the increased second temperature, comparing the first temperature gradient and the second temperature gradient to determine a temperature increase rate, and transmitting, based on the second temperature gradient and the temperature increase rate, an alert to a device associated with a user.

In some implementations, the method further includes comparing the second temperature gradient to a first temperature gradient threshold value, and transmitting an alert to the device associated with the user if the second temperature gradient exceeds the first temperature gradient threshold value.

In some implementations, the method further includes comparing the second temperature gradient to a second temperature gradient threshold value, and transmitting a disable request to the device associated with the user if the second temperature gradient exceeds the second temperature gradient threshold value.

In some implementations, increasing the temperature of the heat source by the predetermined amount occurs at predetermined time interval.

In some implementations, receiving the increased first temperature reading and the increased second temperature reading occurs at a predetermined interval.

In some implementations, the heat source is configured to heat the battery pack. The predetermined amount may be between 5 degrees Celsius and 20 degrees Celsius and the predetermined amount may be approximately 15 degrees Celsius.

In some implementations, increasing the temperature of the heat source by the predetermined amount occurs by increasing the temperature of the heat source by approximately 1 degree Celsius per minute.

In some implementations, comparing the first temperature gradient and the second temperature gradient occurs at a predetermined time interval.

BRIEF DESCRIPTION OF THE DRAWINGS

For a better understanding of the various implementations described and shown herein, reference should be made to the Detailed Description of implementations below, in conjunction with the following drawings in which like reference numerals refer to corresponding parts throughout the figures.

FIG. 9 is a table indicating temperature and temperature deltas between a battery heater and battery that is in a baseline state and a swollen state in accordance with some implementations of the present invention.

DETAILED DESCRIPTION

Figure 1:
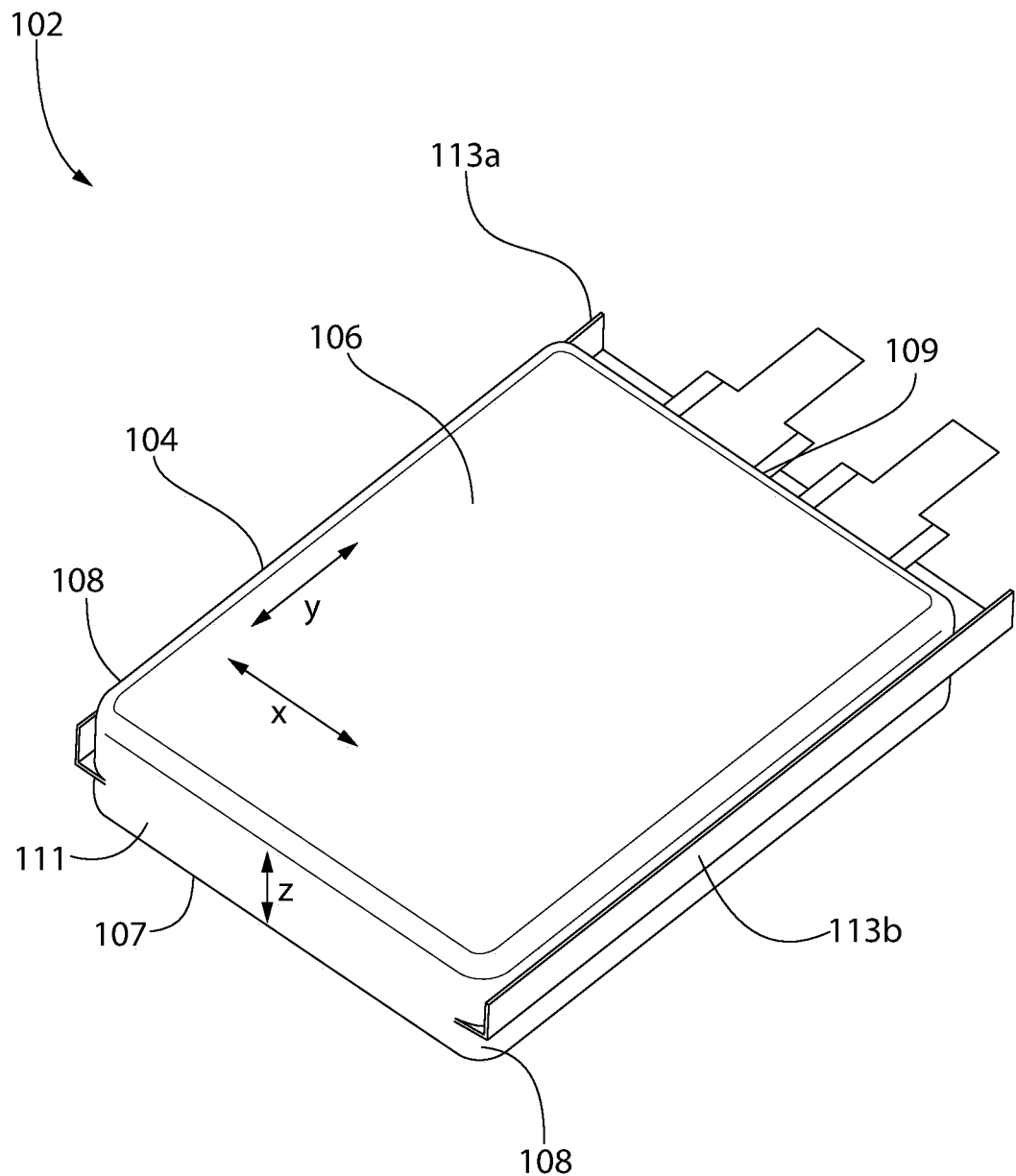
FIG. 1 is a top perspective view of a battery pack in accordance with some implementations of the present invention.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Referring to the drawings in detail, wherein like reference numerals indicate like elements throughout, there is shown in FIGS. 1-9 a battery monitoring system 100, which may include a battery stored within an enclosure of an electronic device. In some implementations, battery monitoring system 100 may be contained within a battery housing, e.g. battery pack, such that battery monitoring system 100 is entirely contained within the battery housing. In some implementations, the battery housing containing battery monitoring system 100 is placed into an electronic device and the battery housing is configured to be used with the electronic device and/or retrofitted to be used with an electronic device.

Referring to FIG. 1, in some implementations, battery 112 (not shown in FIG. 1) is disposed in battery pack 102. Battery pack 102, e.g. a cell pouch, may be a pouch comprised of a plurality of layers and may be configured to create an airtight seal around battery 112. Battery pack 102 may be fixed within or to a device or removable from the device. In some implementations, battery pack 102 is a non-removable battery. Battery 112 may be disposed within battery pack 102 and may be comprised of a jelly-roll structure. Battery 112, e.g. jelly-roll structure, may be comprised of anode and cathode sheets, each separated by a separator. For example, the jelly roll structure may be comprised of an anode-separator-cathode configuration, which is rolled and inserted into the cell pouch. In some implementations, electrolyte is injected into the pouch. The electrolyte serves as a conductive means for ions to move from the cathode to anode when battery 112 is charging, and move from the anode to the cathode when battery 112 is discharging.

Battery 112 may degrade over time resulting in battery pack 102 swelling. For example, over time the electrolyte within battery 112 may degrade releasing gases such as, carbon dioxide or carbon monoxide. The gas generated by battery 112 within battery pack 102 may cause battery pack 102 to swell and expand due to battery pack 102 having an airtight seal around battery 112. In some implementations, without intervention, battery pack 102 may swell and expand, which may cause damage to enclosure 130 or surrounding areas.

Figure 2:
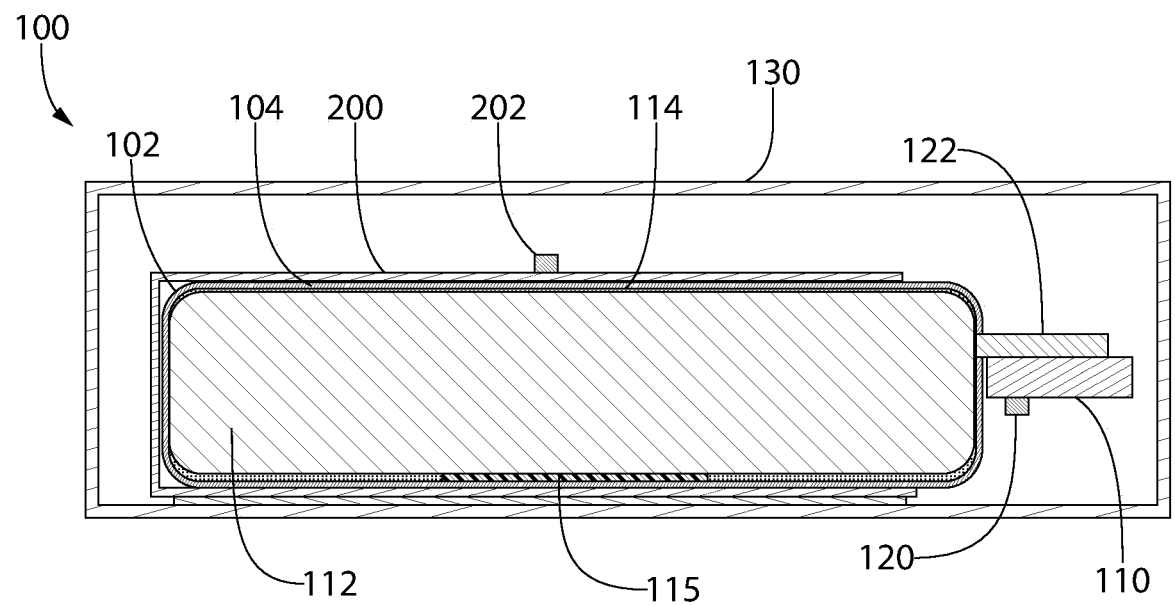
FIG. 2 is an illustration of a battery monitoring system with battery pack in a baseline state in accordance with some implementations of the present invention.
Figure 3:
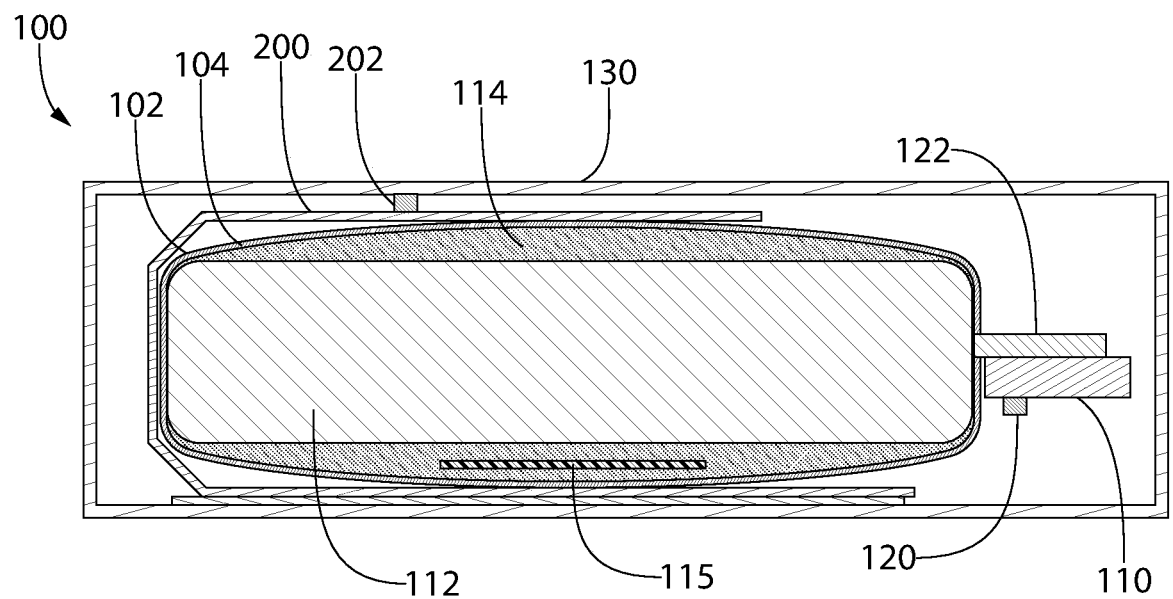
FIG. 3 is an illustration of a battery monitoring system with battery pack in a swollen state in accordance with some implementations of the present invention.
Figure 4:
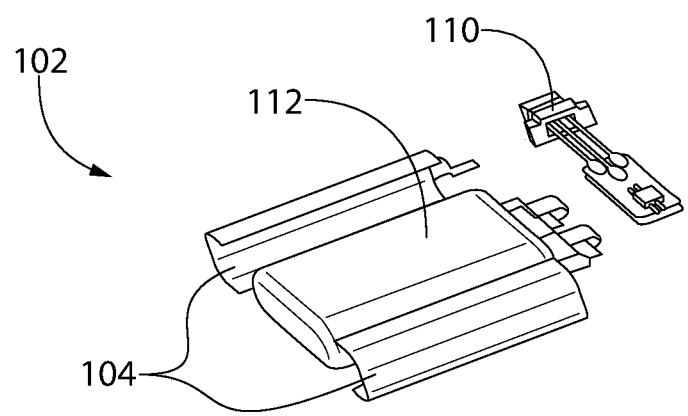
FIG. 4 is an exploded perspective view of a battery pack in accordance with some implementations of the present invention.

Referring to FIGS. 2-4, battery monitoring system 100 may include battery pack 102, battery heater 200, and control board 110. Battery pack 102 and battery heater 200 may be coupled to control board 110. For example, battery pack 102 and battery heater 200 may be communicatively coupled to control board 110 to provide information to control board 110. In some implementations, battery pack 102 and battery heater 200 each include a temperature sensor configured to measure the temperature of battery pack 102 and battery heater 200, respectively. The temperature sensors may be configured to communicate with control board 110 to transmit the temperature measurements of battery pack 102 and battery heater 200 to control board 110.

In some implementations, battery pack 102 is disposed in enclosure 130, which may be an enclosure of an electronic device. In some implementations, battery pack 102 is disposed within an electronic device configured to outdoor use.

For example, battery pack 102 may be disposed within an outdoor doorbell, outdoor security camera, outdoor motion sensor, outdoor smart device, automobile devices, or any other electronic device. However, battery pack 102 may be disposed within an electronic device configured for indoor use. For example, battery pack 102 may be used inside of a warehouse with devices and systems that are thermally warm. In some implementations, battery pack 102 is configured to be discharged for short pulses. For example, battery pack 102 may be stored within an electronic device of an outdoor doorbell and may only discharge for short pulses during events such as doorbell rings and motion detection. Battery pack 102 may be charged back up to full capacity by, for example, trickle charging to allow battery pack 102 to remain at full charge.

Referring to FIG. 1, battery pack 102 may include battery 112 and outer enclosure 104, e.g. cell pouch. Outer enclosure 104 may include top surface 106, bottom surface 107, side walls 108, top seal 109, first side seal 113a, second side seal 113b, and bottom fold 111. In some implementations, outer enclosure 104 is comprised of a flexible material to surround battery 112. For example, outer enclosure 104 may be a bag or pouch and may be sealed around battery 112. During packaging of battery pack 102, battery 112 may be disposed on top of an unfolded outer enclosure 104, which may be unfolded to encompass an area larger than battery 112. Outer enclosure 104 may be folded to cover the entirety of battery 112 and sealed along its edges to create an airtight seal around battery 112. In some implementations, battery 112 is secured to outer enclosure via adhesive 115. For example, adhesive 115 may be configured to secure battery 112 to outer enclosure 104 to prevent battery 112 from moving. Outer enclosure 104 may be sealed along top seal 109, bottom fold 111, first side seal 113a, and second side seal 113b. Top seal 109, bottom fold 111, first side seal 113a, and second side seal 113b may be formed by the excess material of outer enclosure 104 during sealing around battery 112. In some implementations, first side seal 113a and second side seal 113b extend from side walls 108. However, first side seal 113a and second side seal 113b may extend from top surface 106 or bottom surface 107. First side seal 113a and second side seal 113b may extend from side wall 108 and may be folded to abut side wall 108 to reduce the width and overall size of battery pack 102.

In some implementations, outer enclosure 104, e.g. cell pouch, is sealed around battery 112, e.g. jelly roll or cell, by heating and melting the excess material of outer enclosure 104 together to form top seal 109, bottom fold 111, first side seal 113a, and second side seal 113b. However, outer enclosure 104 may be sealed around battery 112 by adhesives, welding, magnets, or any other mechanism capable of sealing outer enclosure 104 around battery 112. In some implementations, battery pack 102 may be a non-removable battery, which is encapsulated by an adhesive label wrap and relies on outer enclosure 104 for mechanical protection. In alternative implementations, battery pack 102 may be a removable battery, in which outer enclosure 104 includes a hard case to provide protecting to battery 112.

In some implementations, outer enclosure 104 is sealed around battery 112 such that first side seal 113a and second side seal 113b extend from side walls 108. However, outer enclosure 104 may be sealed around battery 112 such that first side seal 113a and second side seal 113b extend from top surface 106 or bottom surface 107. First side seal 113a, and second side seal 113b may extend from sides wall 108 and may be folded upwardly and/or downwardly one or more times to abut side wall 108 to reduce the width and overall size of battery pack 102. First side seal 113a, and second side seal 113b may extend from top surface 106 and bottom surface 107 and may be folded upwardly and/or downwardly one or more times to abut top surface 106 and bottom surface 107, respectively, to reduce the width and overall size of battery pack 102.

Referring to FIG. 2, battery pack 102 may be disposed within enclosure 130 and may include interior space 114, which may be the space between battery 112 and outer enclosure 104. Enclosure 130 may be an enclosure of an electronic device. In some implementations, enclosure 130 is a casing, which provides housing for battery pack 102. For example, battery pack 102 may be disposed within enclosure 130, and enclosure 130 may be configured to be inserted and removed from an electronic device. In some implementations, enclosure 130 is portion of an electronic device configured to receive battery pack 102. Enclosure 130 may be configured to surround battery pack 102 such that if battery pack 102 begins to swell and expand, battery pack 102 would begin to contact and abut enclosure 130.

In some implementations, battery 112 of battery pack 102 degrades over time resulting in battery pack 102 being in a swollen state due to gases being released by battery 112 into battery pack 102. The gases may be sealed within battery pack 102 resulting in outer enclosure 104 swelling and expanding. For example, when battery 112 degrades and releases gas, the gas may accumulate within interior space 114 increasing the size of interior space 114 and thereby increasing the distance between outer enclosure 104 and battery 112. As battery 112 continues to degrade, more gas is released, which causes the expansion of interior space 114 and outer enclosure 104 to increase. In some implementations, the expanding of outer enclosure 104 results in top surface 106, bottom surface 107, and side walls 108 bulging outward. In some implementations, interior space 114 is sized to allow for some accumulation of gas released by battery 112 without increasing in size. For example, interior space 114 may be configured to allow battery 112 to expand by between approximately 1% to 25%, 5% to 20%, or 10% to 15% prior to interior space 114 increasing in size. In some implementations, interior space 114 is configured to allow battery 112 to expand approximately 12% without interior space 114 increasing in size. In some implementations, battery pack 102 swelling and expanding due to the accumulation of gas released from battery 112 results in battery 112 becoming dislodged from adhesive 115.

Figure 5:
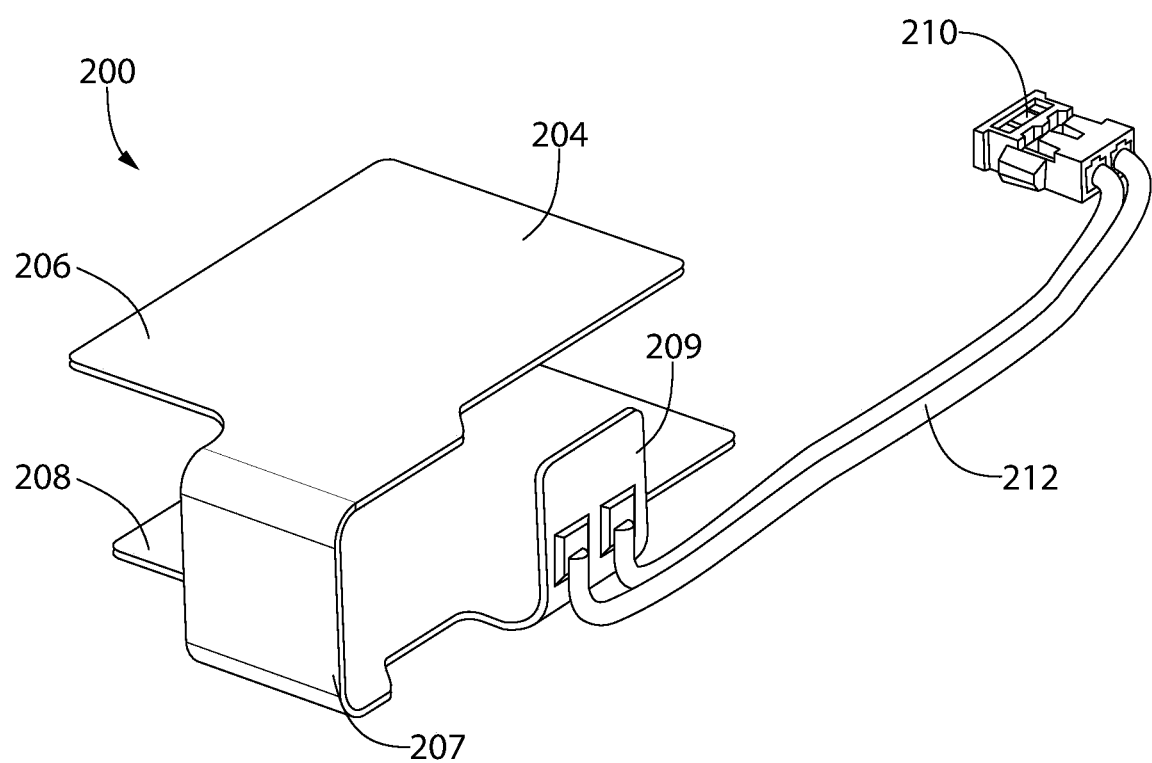
FIG. 5 is a top perspective view of a battery heater shown in isolation from the battery in accordance with some implementations of the present invention.

Referring to FIGS. 2-3 and 5, battery monitoring system 100 may include battery heater 200 to raise the temperature of battery pack 102. For example, low temperatures may be problematic for the performance of battery 112 due to an increased impedance caused by a slowdown of electrochemical kinetics during charging and discharging. To prolong runtime of battery 112 at low temperatures, battery monitoring system 100 may include battery heater 200, which may be used to keep the temperature of battery 112 within battery pack 102 above a specified minimum. Battery heater 200 may be disposed around outer enclosure 104 of battery pack 102. For example, battery heater 200 may be wrapped around outer enclosure 104 of battery pack 102 to cover at least top surface 106 and bottom surface 107 of battery pack 102. Battery heater 200 may be comprised of heating element 204 that is wrapped around battery pack 102. For example, heating element 204 may be comprised of resistive nickel traces on a polyimide film that is wrapped around battery pack 102. Battery heater 200 may be configured to adjust and move around battery pack 102 upon swelling and expanding of battery pack 102. In some implementations, battery heater 200 is a heat source disposed proximate to battery pack 102 to radiate heat adjacent to battery pack 102. In some implementations, battery heater 200 is coupled to control board 110 via connector 210, which may be coupled to heating element 204 by wire 212. Battery heater 200 may be configured to receive requests from control board 110 to provide heat to battery pack 102. For example, battery heater 200 may be configured provide heat to battery 112 to raise the temperature of battery 112 to a maximum temperature of, for example, 125° C. However, battery heater 200 may be configured to raise battery 112 to a maximum temperature greater than 125° C. In some implementations, battery heater 200 is configured to raise battery 112 up to a temperature of 40° C. above the ambient temperature detected by control board 110. In some implementations, the maximum temperature that battery heater 200 can raise the temperature of battery 112 to is limited by the temperature limitations of surrounding components.

In some implementations, battery heater 200 may be a substantial U-shape configured to wrap around battery pack 102. Heating element 204 may include two substantially planar surfaces and a connecting portion. For example, heating element may include first surface 206, second surface 208, and connecting portion 207 configured to connect first surface 206 and second surface 208. In some implementations, first surface 206 and second surface 208 are substantially flat and planar. First surface 206 and second surface 208 may be substantially parallel. In some implementations, battery heater 200 includes extending portion 209. Extending portion 209 may be configured to assist battery heater 200 in wrapping around battery pack 102. In some implementations, extending portion 209 extends from second surface 208 and is perpendicular to first surface 206. Extending portion 209 may be coupled to connector 210 via wire 212. In some implementations, first surface 206, second surface 208, connecting portion 207, and extending portion 209 contact battery pack 102 and provide heat to battery 112. In some implementations, first surface 206 and second surface 208 are configured to provide most of the heat generated by battery heater 200 to battery pack 102. For example, first surface 206 may substantially cover top surface 106 and second surface 208 may substantially cover bottom surface 107. In some implementations, battery heater 200 is sized and shaped to cover more than 50% of the surface area of battery pack 102. However, battery heater 200 may be sized and shaped to cover between approximately 50% and approximately 100%, approximately 60% and approximately 90%, or approximately 70% and approximately 80% of the surface area of battery pack 102.

In some implementations, battery monitoring system 100 may include one or more temperature sensors 202, 120 and control board 110. Control board 110 may be configured to periodically receive temperature measurements from temperature sensor 202 and temperature sensor 120. In some implementations, temperature sensor 120 is disposed proximate to control board 110. For example, control board 110 may be a printed circuit board (PCB) associated with battery 112 and may be where temperature sensor 120 is placed. In some implementations, control board 110 may be a microprocessor/processor placed on a PCB associated with battery 112. In some implementations, control board 110 is configured to receive temperature measurements from temperature sensor 202 and temperature sensor 120 at a predetermined interval and may compare the temperature measurements from temperature sensor 202 and temperature sensor 120 upon receipt. For example, control board 110 may receive temperature measurements from temperature sensor 202 and temperature sensor 120 every seven days. However, control board 110 may receive temperature measurements from temperature sensor 202 and temperature sensor 120 every day, every other day, once a week, once every two weeks, once a month, once over other month, once every three months, once every four months, once every six months, or once a year.

In some implementations, control board 110 is configured to receive temperature measurements from temperature sensor 202 and temperature sensor 120 at times when the ambient temperature is lower. For example, control board 110 may receive temperature measurements from temperature sensor 202 and temperature sensor 120 early in the morning or late at night when the sun has set and the ambient temperature is lower. This prevents any high ambient temperature from adding additional heat to battery 112 thus increasing the difference between temperature measurements from temperature sensor 202 and temperature sensor 120.

Referring to FIG. 2, battery heater 200 may include temperature sensor 202. Temperature sensor 202 may disposed on battery heater 200 and may be configured to measure the temperature of battery heater 200. In some implementations, temperature sensor 202 includes a thermistor disposed on battery heater 200. However, temperature sensor 202 may include a thermocouple, a resistance temperature detector, a semi-conductor based temperature sensor, or any other type of sensor configured to measuring temperature. Temperature sensor 202 may be disposed on battery heater 200 such that temperature sensor 202 provides an accurate temperature measurement of battery heater 200.

In some implementations, temperature sensor 202 is coupled to control board 110. For example, temperature sensor 202 may be commutatively coupled to control board 110 such that temperature sensor 202 transmits temperature measurements to control board 110. In practice, temperature sensor 202 may be configured to measure an increase or decrease in temperature of battery heater 200 and transmit the temperature to control board 110. Upon detection of a temperature from battery heater 200, temperature sensor 202 may transmit the temperature measurement to control board 110.

In some implementations, control board 110, battery 112, battery heater 200, temperatures sensor 202, and temperature sensor 120 may all be contained within battery pack 102. This configuration allows battery monitoring system 100 to be implemented in a self-containing pack. For example, battery monitoring system 100 may be entirely contained within battery pack 102, which may then be retrofitted and/or disposed within an electronic device.

In some implementations, control board 110 is configured to transmit temperature reading requests to temperature sensor 202. Upon receipt of a temperature reading request, temperature sensor 202 may transmit the current temperature of battery heater 200 to control board 110. In some implementations, control board 110 is configured to receive multiple temperature measurements from temperature sensor 202 over a predetermined period of time. For example, control board 110 may receive temperature measurements from temperature sensor 202 over several days to determine the temperature and duration of the temperature of temperature sensor 202.

Referring to FIG. 2, battery pack 102 may include temperature sensor 120. Temperature sensor 120 may disposed on battery pack 102 and may be configured to measure the temperature of battery 112. For example, battery pack 102 may include tab 122 that extends from battery 112. Temperature sensor may be coupled to tab 122 to measure an accurate temperature of battery 112. In some implementations, temperature sensor 120 includes a thermistor disposed on or adjacent to battery pack 102 and configured to measure the temperature of battery 112 disposed within battery pack 102. However, temperature sensor 120 may include a thermocouple, a resistance temperature detector, a semi-conductor based temperature sensor, or any other type of sensor configured to measuring temperature. Temperature sensor 120 may be disposed on battery pack 102 such that temperature sensor 120 provides an accurate temperature reading or measurement of battery 112.

In some implementations, temperature sensor 120 is coupled to control board 110. For example, temperature sensor 120 may be commutatively coupled to control board 110 such that temperature sensor 120 transmits temperature measurements of battery pack 102 to control board 110. In practice, temperature sensor 120 may be configured to measure an increase or decrease in temperature of battery pack 102 and transmit the temperature to control board 110. Upon detection of a temperature from battery pack 102, temperature sensor 120 may transmit the temperature measurement to control board 110.

In some implementations, control board 110 is configured to determine a temperature or thermal gradient of battery monitoring system 100. The thermal gradient may be the delta or difference between the temperature measurements of temperature sensor 202 and temperature sensor 120. As battery 112 begins to degrade and expand, the thermal gradient may increase. In some implementations, control board 110 is configured to determine the thermal gradient upon receipt of the temperature measurements of temperature sensor 202 and temperature sensor 120.

Referring to FIG. 2, battery 112 and battery pack 102 may include a baseline state where battery pack 102 is not swollen or expanded. For example, at the baseline state, interior space 114 and the distance between battery 112 and outer enclosure 104 may be minimal. In some implementations, at the baseline state, the thermal gradient between the temperatures measured by temperature sensor 202 and temperature sensor 120 has a reduced delta or difference compared to when battery pack 102 is swollen or expanded. This is because outer enclosure 104 has a high thermal conductivity allowing the heater generated from battery heater 200 to efficiently heat battery 112. Due to battery heater 200 efficiently providing heat to battery 112, the delta between the temperature measurement of temperature sensor 202 and the temperature measurement of temperature sensor 120 of battery 112 may be minimal when at the baseline state. For example, the delta between the temperature measurement at temperature sensor 202 and temperature sensor 120 may be between approximately 0 and 10 degrees Celsius, 2 and 8 degrees Celsius, or 4 and 6 degrees Celsius. The delta in the thermal gradient between temperature sensors 202 and 120 may be minimal due to the proximity of battery heater 200 to battery 112 of battery pack 102 since outer enclosure 104 is tightly disposed around battery 112, outer enclosure 104 has a high thermal conductivity, and the size of interior space 114 is minimal. For example, the distance between temperature sensor 202 and battery 112 may be minimal due to the thinness of outer enclosure 104 and reduced size of interior space 114, thereby the delta between the measurements of the temperature of battery 112 via temperature sensor 120 and the temperature of battery heater 200 via temperature sensor 202 may be within 8 to 10 degrees Celsius.

Referring to FIG. 3, battery pack 102 may swell and expand due to the degradation of battery 112, which results in the release of gas. Upon degradation of battery 112, the gas released by battery 112 is confined to battery pack 102 due to outer enclosure 104 being sealed around battery 112. The confined gas accumulates within battery pack 102 and results in the expansion of interior space 114, thereby causing battery pack 102 to swell and expand. The swelling and expanding of battery pack 102 and the increase in interior space 114 results in an increase in the distance between temperature sensor 202 and battery 112 as interior space 114 becomes filled with gas released from battery 112. As gas fills interior space 114, battery heater 200 is no longer able to efficiently heat battery 112 due to the lower thermal conductivity of the gas compared to the thermal conductivity of outer enclosure 104. The decreased thermal conductivity of the gas in interior space 114 results in battery 112 having a lower temperature than battery heater 200, even when battery heater 200 is attempting to heat battery 112. This increases the thermal gradient between temperature sensor 202 and temperature sensor 120, which indicates that battery pack 102 has become swollen and expanded. For example, the swelling and expanding of interior space 114 and low thermal conductivity of the gas within interior space 114 may result in the delta between the thermal gradient of temperature sensor 202 and temperature sensor 120 being greater than when battery 112 is at the baseline state, thereby increasing the thermal gradient.

In some implementations, the expansion of interior space 114 also results in the displacement of battery heater 200 from battery 112. The displacement of battery heater 200 from battery 112 may result in battery heater 200 not being able to efficiently provide heat to battery 112 due to the increased in distance between battery heater 200 and battery 112. For example, expansion of interior space 114 may result in an increase in the distance between top surface 106 of outer enclosure 104 and battery 112, thereby increasing the distance between battery heater 200 and battery 112.

Figure 6:
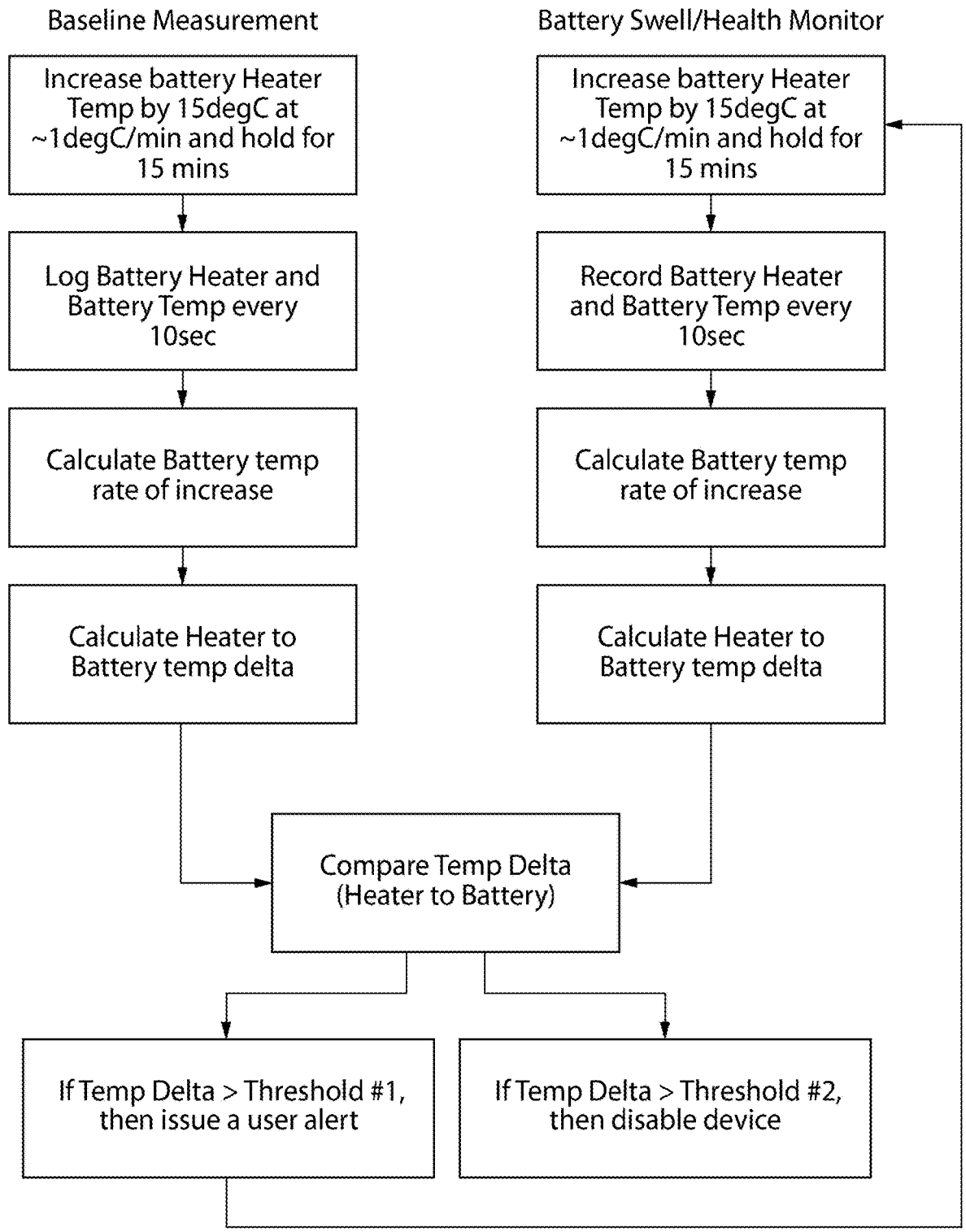
FIG. 6 is an exemplary flowchart of a method performed by the battery monitoring system of FIG. 1.

Referring to FIG. 6, a method of monitoring a thermal gradient of a battery is shown. In some implementations, control board 110 is configured to obtain temperature measurements from temperature sensor 202 and temperature sensor 120 when battery pack 102 is in a baseline state. Control board 110 may increase the temperature of battery heater 200 at a predetermined rate by a specific amount, or maintain a specific temperature for a predetermined duration. Control board 110 may record and store the temperature measurements of battery heater 200 from temperature sensor 202 and temperature sensor 120.

For example, control board 110 may increase the temperature of battery heater 200 by approximately 15 degrees Celsius at a rate of approximately 1 degree Celsius per minute to a final temperature and maintain the final temperature for approximately 15 minutes. Control board 110 may increase the temperature of battery heater 200 by approximately 5 degrees Celsius, approximately 10 degrees Celsius, approximately 15 degrees Celsius, approximately 20 degrees Celsius, approximately 25 degrees Celsius, or greater than 25 degrees Celsius. Control board 110 may increase the temperature of battery heater 200 at rate of approximately 1 degree Celsius per minute, approximately 2 degrees Celsius per minute, approximately 3 degrees Celsius per minute, approximately 4 degrees Celsius per minute, approximately 5 degrees Celsius per minute, or greater than 5 degrees Celsius per minute. Control board 110 may maintain the final temperature of battery heater 200 for approximately 5 minutes, approximately 10 minutes, approximately 15 minutes, approximately 20 minutes, approximately 25 minutes, approximately 30 minutes, or greater than 30 minutes.

In some implementations, control board 110 is configured to receive and store the temperature measurements from temperature sensor 202 and temperature sensor 120 when battery pack 102 is in a baseline state. Control board 110 may be configured to receive and store within a memory of control board 110 the temperature measurements from temperature sensor 202 and temperature sensor 120 at periodic intervals. For example, control board 110 may receive and store the temperature measurements from temperature sensor 202 and temperature sensor 120 every 5 seconds, every 10 seconds, every 15 seconds, every 20 seconds, every 25 seconds, every 30 seconds, or every 60 seconds. In a preferred implementation, control board 110 receives and stores the temperature measurements from temperature sensor 202 and temperature sensor 120 every 10 seconds. Control board 110 may calculate the rate of temperature increase of the temperature measurements from temperature sensor 120 to determine the rate of temperature increase of battery 112 in response to the increasing temperature of battery heater 200. In some implementations, control board 110 is configured to calculate the thermal gradient/delta between temperature sensor 202 and temperature sensor 120 when battery pack 102 is in the baseline state. For example, control board 110 may determine the temperature differences at various points of time between temperature sensor 202 and temperature sensor 120 for a predetermined amount of time, such as 30 minutes.

In some implementations, control board 110 is configured to obtain temperature measurements from temperature sensor 202 and temperature sensor 120 when battery pack 102 is in a swollen state. In some implementations, the measurement interval and temperature increases in the swollen state and the baseline state are the same. Control board 110 may increase and store the temperature of battery heater 200 at a predetermined rate by specific amount, maintain a specific temperature for a predetermined duration, and record the temperature measurements from temperature sensor 202 and temperature sensor 120.

In some implementations, control board 110 is configured to receive and store the temperature measurements from temperature sensor 202 and temperature sensor 120 when battery pack 102 is in a swollen state. Control board 110 may be configured to receive and store within a memory of control board 110 the temperature measurements from temperature sensor 202 and temperature sensor 120 at periodic intervals. For example, control board 110 may receive and store the temperature measurements from temperature sensor 202 and temperature sensor 120 every 5 seconds, every 10 seconds, every 15 seconds, every 20 seconds, every 25 seconds, every 30 seconds, or every 60 seconds. In a preferred implementation, control board 110 receives and stores the temperature measurements from temperature sensor 202 and temperature sensor 120 every 10 seconds. Control board 110 may calculate the rate of temperature increase of the temperature measurements from temperature sensor 120 to determine the rate of temperature increase of battery 112 in response to the increasing temperature of battery heater 200. In some implementations, control board 110 is configured to calculate the thermal gradient/delta between temperature sensor 202 and temperature sensor 120 when battery pack 102 is in the swollen state. For example, control board 110 may determine the temperature differences at various points of time between temperature sensor 202 and temperature sensor 120 for a predetermined amount of time, such as 30 minutes.

In some implementations, control board 110 is configured to compare the thermal gradient of battery pack 102 in the baseline state to the thermal gradient of battery pack 102 in the swollen state to determine a thermal gradient difference. In some implementations, control board 110 is configured to compare the thermal gradient difference to predetermined thresholds. For example, control board 110 may have a first gradient threshold and a second gradient threshold higher than the first gradient threshold. If the thermal gradient difference is higher than the first gradient threshold, then control board 110 may transmit an alert or notification to an electronic device associated with a user. The thermal gradient difference being higher than the first gradient threshold may indicate that battery pack 102 has begun to swell and expand due to the degradation of battery 112. If the thermal gradient difference is higher than the second gradient threshold, then control board 110 may transmit an alert or notification to an electronic device associated with a user and/or disable the electronic device that battery pack 102 is disposed within. The thermal gradient difference being higher than the second gradient threshold may indicate that battery pack 102 has significantly swelled and expanded, and that disabling of the electronic device that battery pack 102 is disposed within is necessary to prevent further damage to the electronic device and/or battery 112, and the surrounding area.

Figure 7A:
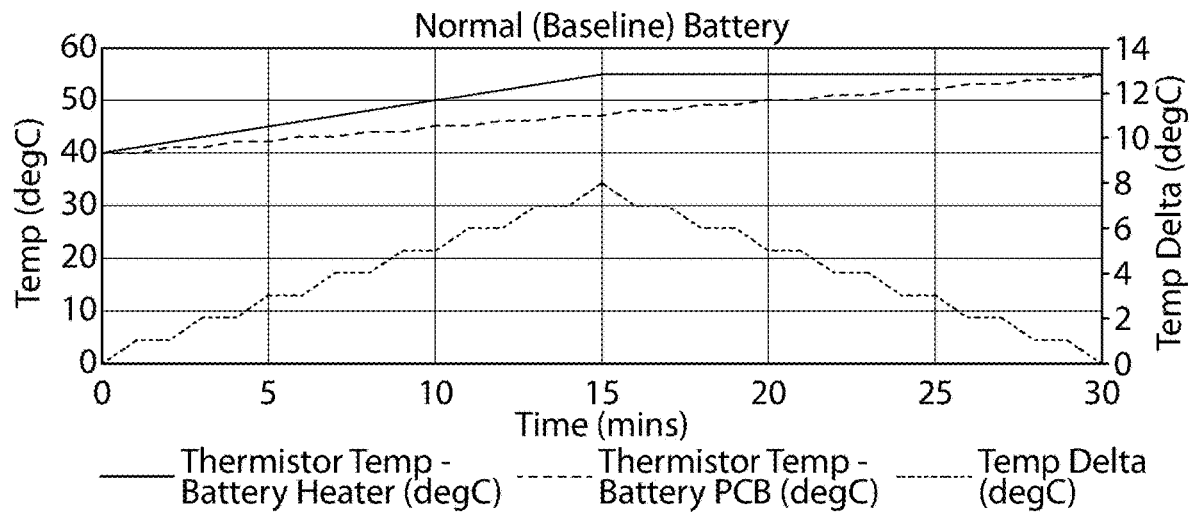
FIG. 7A is a graph of temperature and temperature delta between a battery heater and a battery in a baseline state in accordance with some implementations of the present invention.
Figure 7B:
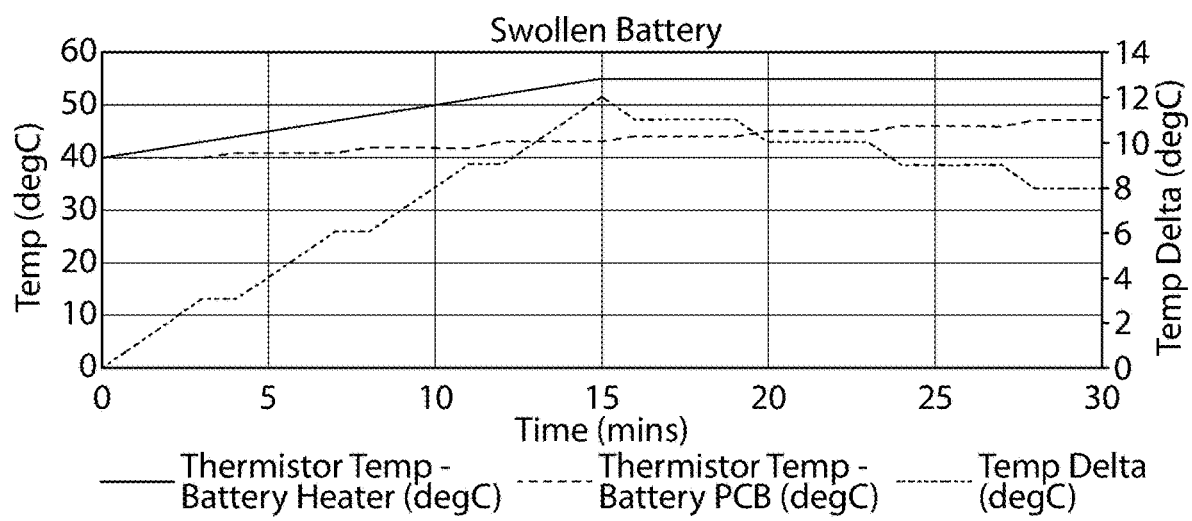
FIG. 7B is a graph of temperature and temperature delta between a battery heater and a battery in a swollen state in accordance with some implementations of the present invention.

Referring to FIGS. 7A and 7B, control board 110 may be communicatively coupled to temperature sensor 202 and temperature sensor 120. For example, control board 110 may be connected to temperature sensor 202 and temperature sensor 120 via one or more wires. In some implementations, control board 110 is directly connected to each of temperature sensor 202 and temperature sensor 120 via a wire. However, control board 110 may be wirelessly connected to temperature sensor 202 and temperature sensor 120. Control board 110 may be configured to measure the delta of the thermal gradient between temperature sensor 202 and temperature sensor 120. In the baseline state, the delta between the thermal gradient between temperature sensor 202 and temperature sensor 120 may increase as the temperature of battery heater 200 increases, and thus as the temperature measurement of temperature sensor 202 increase. At the baseline state, as the temperature of battery heater 200 increases and levels off after a predetermined amount of time, the temperature measurement of temperature sensor 120 increases. Due to the size of battery 112, the rate of increase of the temperature measurement of temperature sensor 120 is not consistent with the rate of increase of battery heater 200, resulting in the delta between the thermal gradients between temperature sensor 202 and temperature sensor 120 increasing and then decreasing.

Referring to FIG. 7A, at the baseline state, the rate of increase and decrease of the delta of the thermal gradients between temperature sensor 202 and temperature sensor 120 may be substantially the same. For example, battery heater 200 may increase its temperature and then maintain an increased temperature after a predetermined period of time. In response, temperature sensor 120 may begin to measure an increase in the temperature of battery 112 at a constant rate until temperature sensor 120 measures a temperature corresponding with the maintained increased temperature of battery heater 200. The delta between the thermal gradients between temperature sensor 202 and temperature sensor 120 may increase at a constant rate until after the predetermined period of time and then the delta may decrease at the constant rate. In some implementations, the predetermined amount of time may be approximately 5 minutes, 10 minutes, 15 minutes, or 30 minutes.

Referring to FIG. 7B, when battery 112 has begun to degrade and battery pack 102 is in a swollen and expanded state, the rate of increase and decrease of the delta of the thermal gradients between temperature sensor 202 and temperature sensor 120 may be substantially different. For example, battery heater 200 may increase its temperature and then maintain an increased temperature after a predetermined period of time. In response, temperature sensor 120 may begin to measure an increase in the temperature of battery 112 at a constant rate, but may not reach the temperature corresponding with the maintained increased temperature of battery heater 200. The delta between the thermal gradient between temperature sensor 202 and temperature sensor 120 may increase at a constant rate until after the predetermined period of time and then the delta may decrease at the different rate and stay at a non-zero value. In some implementations, the delta between the thermal gradient between temperature sensor 202 and temperature sensor 120 is greater when battery pack 102 is in the swollen state than when battery pack 102 is in the baseline state. In some implementations, the predetermined amount of time is approximately 5 minutes, approximately 10 minutes, approximately 15 minutes, or approximately 30 minutes.

Figure 8:
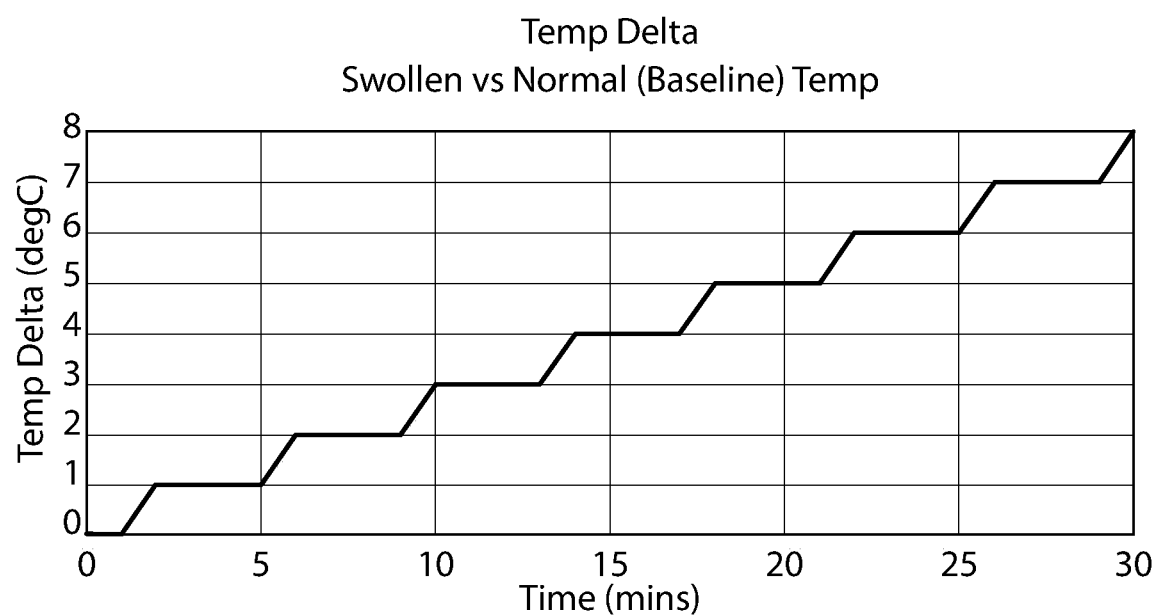
FIG. 8 is a graph of temperature deltas between a battery heater and battery that is in a baseline state and a swollen state in accordance with some implementations of the present invention.

Referring to FIGS. 8 and 9, the delta between the thermal gradient between temperature sensor 202 and temperature sensor 120 when battery pack 102 is at the baseline state and at the swollen state may increase over time. For example, after a certain period of time, such as 15 minutes, the delta between the thermal gradient between temperature sensor 202 and temperature sensor 120 when battery pack 102 is in the swollen state is greater than the delta of the thermal gradient between temperature sensor 202 and temperature sensor 120 when battery pack 102 is the baseline state. This is due to the gas accumulating within interior space 114 resulting in a greater delta between the thermal gradient between temperature sensor 202 and temperature sensor 120 when battery pack 102 is swollen and expanded.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An apparatus comprising:
   at least one battery;
   a first temperature sensor configured to provide a first temperature value associated with a temperature of the at least one battery;
   a heat source disposed proximate to the at least one battery and configured to heat the at least one battery;
   a second temperature sensor configured to provide a second temperature value associated with a temperature of the heat source; and
   a control board coupled to the first temperature sensor and the second temperature sensor, the control board configured to:
      receive the first temperature value and the second temperature value;
      compare the first temperature value and the second temperature value to determine a temperature gradient;
      transmit an alert if the temperature gradient exceeds a first temperature gradient threshold; and
      disable an electronic device or one or more components associated with the electronic device powered by the at least one battery if the temperature gradient exceeds a second temperature gradient threshold, the second temperature gradient threshold being greater than the first temperature gradient threshold.

2. The apparatus of claim 1, wherein the at least one battery is disposed within a battery pack and the heat source is wrapped around an exterior surface of the battery pack to provide heat to the at least one battery.

3. The apparatus of claim 1, wherein the heat source is disposed at least partially around the at least one battery.

4. The apparatus of claim 1, wherein the apparatus is integrated within the electronic device, the electronic device comprising at least one of an outdoor doorbell, an outdoor security camera, an outdoor motion sensor, an outdoor smart device, or an automobile.

5. The apparatus of claim 1, wherein the heat source includes a first surface and a second surface, the first surface and the second surface being substantially flat.

6. The apparatus of claim 5, wherein the first surface and the second surface are approximately parallel.

7. The apparatus of claim 5, wherein the first surface is configured to be in contact with at least portions of a top surface of the at least one battery and the second surface is configured to be in contact with at least portions of a bottom surface of the at least one battery.

8. The apparatus of claim 1, wherein the at least one battery is designed with a jelly-roll structure and comprises anode sheets and cathode sheets separated by a separator.

9. The apparatus of claim 8, wherein the apparatus comprises a battery pack that is designed as a cell pouch, the at least one battery being disposed within the battery pack, and wherein the battery pack provides an airtight seal around the at least one battery.

10. The apparatus of claim 9, wherein the battery pack further comprises an electrolyte, and wherein gases released from the electrolyte affect a temperature profile of the at least one battery.

11. An electronic device comprising:
a battery pack disposed within an enclosure of the electronic device, the battery pack comprising:
at least one battery;
a first temperature sensor configured to provide a first temperature value associated with a temperature of the at least one battery;
a heat source disposed proximate to the at least one battery and configured to heat the at least one battery;
a second temperature sensor configured to provide a second temperature value associated with a temperature of the heat source; and
a control board coupled to the first temperature sensor and the second temperature sensor, the control board configured to:
receive the first temperature value and the second temperature value;
compare the first temperature value and the second temperature value to determine a temperature gradient;
transmit an alert if the temperature gradient exceeds a first temperature gradient threshold; and
disable the electronic device or one or more components associated with the electronic device powered by the at least one battery if the temperature gradient exceeds a second temperature gradient threshold, the second temperature gradient threshold being greater than the first temperature gradient threshold.

12. The electronic device of claim 11, wherein the at least one battery is disposed within the battery pack and the heat source is wrapped around an exterior surface of the battery pack to provide heat to the at least one battery.

13. The electronic device of claim 11, wherein the heat source is disposed at least partially around the at least one battery.

14. The electronic device of claim 11, wherein the electronic device comprises at least one of an outdoor doorbell, an outdoor security camera, an outdoor motion sensor, an outdoor smart device, or an automobile.

15. The electronic device of claim 11, wherein the heat source includes a first surface and a second surface, the first surface and the second surface being substantially flat and planar.

16. The electronic device of claim 15, wherein the first surface and the second surface are approximately parallel.

17. The electronic device of claim 15, wherein the first surface is configured to be in contact with at least portions of a top surface of the at least one battery and the second surface is configured to be in contact with at least portions of a bottom surface of the at least one battery.

18. The electronic device of claim 11, wherein the at least one battery is designed with a jelly-roll structure and comprises anode sheets and cathode sheets separated by a separator.

19. The electronic device of claim 18, wherein the battery pack is designed as a cell pouch, the at least one battery being disposed within the battery pack, and wherein the battery pack provides an airtight seal around the at least one battery.

20. The electronic device of claim 19, wherein the battery pack further comprises an electrolyte, and wherein gases released from the electrolyte affect a temperature profile of the at least one battery.

* * * * *